United States Patent [19]

Horikawa et al.

[11] Patent Number: 5,149,264
[45] Date of Patent: Sep. 22, 1992

[54] METHOD OF PRODUCING CERAMIC PRODUCTS

[75] Inventors: Osamu Horikawa, Toyoake; Yukihisa Wada, Aichi, both of Japan

[73] Assignee: NGK Insulators, Ltd., Aichi, Japan

[21] Appl. No.: 676,941

[22] Filed: Mar. 18, 1991

[30] Foreign Application Priority Data

Mar. 28, 1990 [JP] Japan .................................. 2-76709

[51] Int. Cl.$^5$ .......................... F24D 23/02; F27B 21/00
[52] U.S. Cl. .......................... 432/2; 432/258; 432/259; 432/5
[58] Field of Search .......................... 432/5, 2, 251–253, 432/258, 259

[56] References Cited

U.S. PATENT DOCUMENTS

| | | |
|---|---|---|
| 3,904,352 | 9/1975 | Thurnauer et al. ............... 432/5 |
| 4,014,968 | 3/1977 | Simon . | |
| 4,184,840 | 1/1980 | Gamberg et al. ............... 432/258 |
| 4,259,061 | 3/1981 | Dubetsky ............... 432/258 |
| 4,405,300 | 9/1983 | Lubowsky et al. ............... 432/2 |
| 4,715,812 | 12/1987 | Von Matuscka et al. ......... 432/259 |

FOREIGN PATENT DOCUMENTS

| | | |
|---|---|---|
| 0234887 | 9/1987 | European Pat. Off. . |
| 1808143 | 6/1970 | Fed. Rep. of Germany . |
| 3337875 | 4/1985 | Fed. Rep. of Germany . |
| 2612511 | 9/1988 | France . |
| 491427 | 9/1938 | United Kingdom . |

Primary Examiner—Henry C. Yuen
Attorney, Agent, or Firm—Parkhurst, Wendel & Rossi

[57] ABSTRACT

An excellent method of firing ceramic materials is provided wherein bending or deformation of a supporting plate which supports a green shaped body of the ceramic materials, deformation of the green shaped body caused by its own weight, and cracks and breakage of fired shaped body, during the firing of the shaped body of the ceramic materials, are eliminated. The method comprises mounting a green supporting plate on a fired supporting plate, mounting a green structural body of ceramic raw materials on the green supporting plate, and firing the green structural body on the green supporting plate.

7 Claims, 1 Drawing Sheet

METHOD OF PRODUCING CERAMIC PRODUCTS

BACKGROUND OF THE INVENTION

1. Field of the Invention

The present invention relates to a method of producing ceramic products, particularly ceramic honeycomb structural bodies.

2. Related Art Statement

Heretofore, in order to produce ceramic products by firing shaped green bodies of ceramic raw materials of the ceramic products in a firing furnace, a method is known of mounting and firing a shaped green body of ceramic raw materials on a supporting ceramic pillow or supporting plate without directly mounting the shaped green body on a shelf plate of the firing furnace, for preventing formation of cracks and adhesion of the shaped green bodies to the shelf plate. In producing ceramic honeycomb structural bodies, a method of firing shaped green bodies of ceramic raw materials is prevailingly effected wherein spacers are inserted between supporting plates and shelf plates, as disclosed in the applicant's U.S. Pat. No. 4,786,542 "Setters and Firing of Ceramic Honeycomb Structural Bodies by Using the Same".

Such insertion method has a drawback in that, when firing a heavy honeycomb structural body, the supporting plate is bent downwardly by the weight of the honeycomb structural body itself, so that the end surface of the honeycomb structural body supported by the supporting plate is deformed. A similar defect is also found when a plurality of honeycomb structural bodies are superposed on the supporting plate exerting a heavy weight load thereon.

Moreover, if a green or non-fired supporting plate is used for supporting a green honeycomb structural body of raw ceramic materials at the time of firing the green honeycomb structural body, cracking or breakage of ribs of the honeycomb structural body caused by friction resistive force generated at the contacting surfaces of the honeycomb structural body and the supporting plate by expansion and shrinkage during the firing thereof is easily prevented. However, in such a case, there is a drawback in that the honeycomb structural body is liable to deform with the green supporting plate due to its weight. If a fired supporting plate is used for supporting the green honeycomb structural body during firing, cracking or breakage of ribs of the honeycomb structural body is liable to occur, though the deformation of the honeycomb structural body due to its weight is easily prevented.

SUMMARY OF THE INVENTION

An object of the present invention is to obviate the above drawbacks.

The present invention is a method of producing a ceramic product by firing a shaped green structural body of ceramic raw materials of the ceramic product in a firing furnace, comprising, mounting a green supporting plate on a fired supporting plate, mounting a green structural body of the ceramic raw materials on the green supporting plate, and firing the green structural body on the green supporting plate.

The green structural body is preferably a green honeycomb structural body of ceramic raw materials.

The green supporting plate and the fired supporting plate are honeycomb ceramic plates having gas passages in vertical direction thereof, and cell density or cell opening of the honeycomb structure is 0.8–310 cells/cm$^2$ (5–2000 cells/in$^2$).

A plurality of superposed fired supporting plates and green supporting plates can be used. The fired supporting plate and the green supporting plate are preferably made of a same material and have a same cell density. However, they can be used also when they are made of different materials and have different cell densities.

Preferably, the fired supporting plate and the green supporting plate are cordierite plates of honeycomb structure when the green structural body of ceramic raw materials to be fired is a cordierite honeycomb structure, or similarly a mullite plate of honeycomb structure when the green structural body of ceramic raw materials to be fired is a mullite honeycomb structure. Combinations of the supporting plate and the green structural body of ceramic materials other than that described above can also be used. The fired supporting plate and the green supporting plate may have a shape of elliptical, circular, rectangular, etc., or other shape adapted to shape of the green structural body of ceramic raw materials to be mounted thereon.

If a spacer is used between the shelf plate of the firing furnace and the supporting plate to provide a space therebetween, air ventilation property of the firing furnace is improved, and a binder and a cell-forming agent contained in the ceramic raw materials can be easily burned out, so that cracking or breakage of the fired structural body caused by burning of unburned residue of the binder and the cell-forming agent can be decreased.

By the arrangement of superposing a fired supporting plate and a non-fired or green supporting plate, deformation of the green supporting plate can be prevented as well as cracking breakage and deformation of the green structural body caused by its own weight and friction resistive force thereof.

BRIEF DESCRIPTION OF THE DRAWING

For a better understanding of the present invention, reference is made to the accompanying drawings, in which.

Numbers in the drawings.

1. . . green honeycomb structural body of ceramic raw materials,
2. . . green supporting plate,
3. . . fired supporting plate,
4. . . spacer

DESCRIPTION OF THE PREFERRED EMBODIMENTS

Hereinafter, the present invention will be explained in more detail with reference to examples.

EXAMPLE 1-4 AND REFERENTIAL EXAMPLES 1-2

Figure 1:
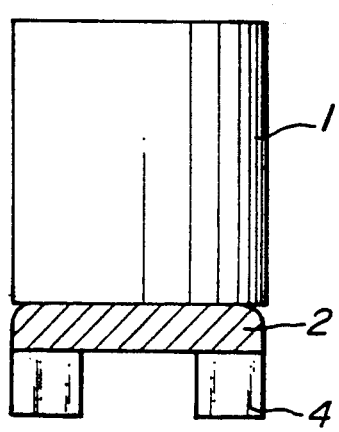
FIG. 1 is a schematic side view of a conventional firing state of a structural body of ceramic raw materials.
Figure 2:
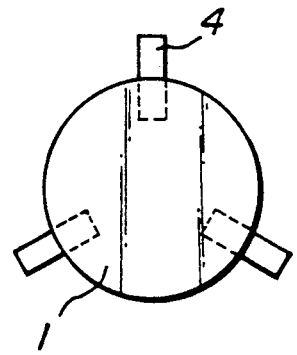
FIG. 2 is a schematic plan view thereof.

Referring to FIGS. 1 and 2, a conventional way of firing a honeycomb structural body of ceramic raw materials is shown as a reference.

Figure 3:
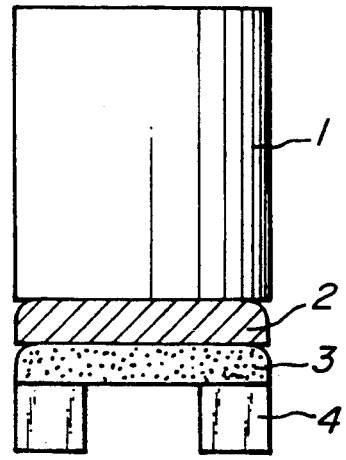
FIG. 3 is schematic side view of a firing state of a structural body of ceramic raw materials according to an example of the method of the present invention.

Referring to FIG. 3, an embodiment of the method of the present invention is shown. A supporting plate 2 is mounted on a fired green supporting plate 3, a green honeycomb structural body of ceramic raw materials 1 is mounted on the green supporting plate 2, and a spacer 4 is inserted between the fired supporting plate 3 and a shelf plate (not shown) of a firing furnace. Firing of the green honeycomb structural body is then carried out. The green supporting plate 2 and the fired supporting plate 3 have a same shape and size. The results are shown in the following Table 1.

breakage of the ribs of the honeycomb structural body caused by shrinkage distortions can be prevented from occurring.

Although the present invention has been explained with specific examples and numeral values, it is of course apparent to those skilled in the art that various changes and modifications thereof are possible without departing from the broad spirit and aspect of the present invention as defined in the appended claims.

We claim:

1. A method of producing a fired ceramic product,

TABLE 1

| Test No. | Supporting plate | | | | Green honeycomb structural body | | | | | Note |
|---|---|---|---|---|---|---|---|---|---|---|
| | presence of fired supporting plate | shape, size (mm) | cell density | wall thickness (mm) | shape, size (mm) | cell density | wall thickness (mm) | weight (kg) | distortion (mm) | |
| 1 | non | circle: 190φ × 20 | 20 cells/cm$^2$ | 0.5 | circle: 190φ × 175 | 20 cells/cm$^2$ | 0.5 | 4.2 | 15 | Ref. Example 1 |
| 2 | yes | circle: 190φ × 20 | " | " | circle: 190φ × 175 | " | " | " | 5 | Example 1 |
| 3 | non | circle: 230φ × 20 | " | " | circle: 230φ × 300 | " | " | 9.0 | 25 | Ref. Example 2 |
| 4 | yes | circle: 230φ × 20 | " | " | circle: 230φ × 300 | " | " | " | 10 | Example 2 |
| 5 | " | circle: 230φ × 25 | " | " | circle: 230φ × 300 | " | " | " | 7 | Example 3 |
| 6 | " | circle: 230φ × 30 | " | " | circle: 230φ × 300 | " | " | " | 3 | Example 4 |

As seen from the above Table 1, when a honeycomb structural body is mounted and fired on fired and green supporting plates, distortion at the end surface of the honeycomb structural body is mall and deformation due to its own weight is small as compared with those of Referential Examples 1 and 2. When the thicknesses of the fired supporting plate and the green supporting plate are increased, distortion at the end surface of the fired honeycomb structural body can be decreased, as seen in Example 2-4.

By superposing a fired supporting plate and a green supporting plate, deformations of the green supporting plate and the green structural body caused by its own weight can be suppressed, so that deformation of a honeycomb structural body to be fired mounted thereon during firing thereof can be prevented.

The present invention is useful in producing general ceramic products, such as dishes, bowls, tiles, bricks, etc., and particularly useful in firing green honeycomb structural bodies and large size ceramic products.

Though usually chamfering of the supporting plates are not necessary, chamfering of the supporting plates as described in U.S. Pat. No. 4,786,542 may be effected if desired, and the disclosure of the U.S. Pat. No. 4,786,542 is incorporated herein by reference.

Even if spacers are not used during the firing a honeycomb structural body, shrinkage distortions between the green supporting plate and the green honeycomb structural body can be mitigated as compared to the case of directly mounting the green supporting plate on a shelf plate of firing furnace, so that cracking and comprising the steps of:
 mounting a green supporting plate on a fired supporting plate;
 mounting a green ceramic body directly on said green supporting plate; and
 firing said green ceramic body, said green supporting plate and said fired supporting plate in a firing furnace to produce said fired ceramic product from said green ceramic body.

2. The method of claim 1, wherein the green ceramic body is a green honeycomb structural body.

3. The method of claim 1, wherein the green supporting plate and the fired supporting plate are ceramic plates of honeycomb structural body having gas passages in vertical direction thereof, and cell density or opening of the cell of the honeycomb structure is 0.8-310 cells/cm$^2$ (5-2000 cells/in$^2$).

4. The method of claim 1, wherein a plurality of superposed fired supporting plates and green supporting plates are used.

5. The method of claim 1, wherein the fired supporting plate and the green supporting plate are made of a same material and have a same cell density.

6. The method of claim 1, wherein the fired supporting plate and the green supporting plate are made of cordierite or mullite.

7. The method of claim 1, wherein a spacer is inserted between the fired supporting plate and a shelf plate of the firing furnace.

* * * * *